United States Patent [19]

Flowerday

[11] Patent Number: 4,598,948
[45] Date of Patent: Jul. 8, 1986

[54] VEHICLE ARMREST SUPPORT

[75] Inventor: Carl W. Flowerday, Holland, Mich.

[73] Assignee: Prince Corporation, Holland, Mich.

[21] Appl. No.: 544,121

[22] Filed: Oct. 21, 1983

[51] Int. Cl.[4] .............................................. A47C 7/54
[52] U.S. Cl. .................................... 297/411; 297/417
[58] Field of Search ............... 297/411, 417, 346, 113, 297/112, 115; 108/138, 119; 248/419

[56] References Cited

U.S. PATENT DOCUMENTS

| | | | |
|---|---|---|---|
| 267,893 | 11/1882 | Hutton | 297/417 |
| 290,283 | 12/1883 | Thomas | 248/419 |
| 305,005 | 9/1884 | Hutton | 108/138 |
| 340,970 | 5/1886 | Adelsperger | 297/346 |
| 389,597 | 9/1888 | Rightmyer | 297/346 |
| 457,883 | 8/1891 | Stratton | 297/346 |
| 1,399,744 | 12/1921 | Brophy . | |
| 2,043,626 | 6/1936 | Morrison . | |
| 2,506,156 | 5/1950 | Long . | |
| 2,554,422 | 5/1951 | Richards et al. . | |
| 2,871,075 | 1/1959 | Stone | 108/119 |
| 3,191,995 | 6/1965 | Shelton | 297/417 |
| 4,165,901 | 8/1979 | Swenson | 297/417 |
| 4,244,623 | 1/1981 | Hall et al. | 297/411 |
| 4,307,913 | 12/1981 | Spiegelhoff . | |
| 4,311,338 | 1/1982 | Moorhouse | 297/411 |

FOREIGN PATENT DOCUMENTS

| | | | |
|---|---|---|---|
| 0224818 | 12/1983 | Japan | 297/417 |
| 746313 | 3/1956 | United Kingdom | 297/417 |

*Primary Examiner*—William E. Lyddane
*Assistant Examiner*—Mark W. Binder
*Attorney, Agent, or Firm*—Price, Heneveld, Huizenga & Cooper

[57] ABSTRACT

An armrest assembly includes a pair of mounting brackets each including sockets for pivotally receiving a pair of spaced L-shaped legs facing outwardly from each other to provide a compact structure to which a padded armrest can be attached for use.

1 Claim, 3 Drawing Figures

VEHICLE ARMREST SUPPORT

BACKGROUND OF THE INVENTION

The present invention relates to a vehicle armrest support and particularly one which is adjustable.

Many automobiles and other modern vehicles include armrests positioned between the driver and passenger seats for the comfort of the vehicle occupants. Typically, the armrests are fixed or are pivoted at an end near the backs of the seats so that they can be pivoted to a vertical plane out of the way. Thus, the armrests typically provide a use position when lowered and a non-use position when raised.

SUMMARY OF THE PRESENT INVENTION

The armrest of the present invention provides an armrest which is movable between two usable positions to provide adjustment for different seat positions or for different drivers or passengers. The armrest moves between a forward and a rearward position and in the rearward position also provides improved access to vehicle controls such as parking brakes which may be positioned between the seats directly in front of the armrest. The relatively compact structure can be integrally molded with the support mechanism comprising two pairs of identical integrally molded parts.

Apparatus embodying the present invention include a pair of mounting brackets each including means for pivotally receiving a pair of spaced L-shaped legs facing outwardly from each other to provide a compact structure to which a padded armrest can be attached for use.

These and other features, objects and advantages of the present invention will become apparent upon reading the following description thereof together with reference to the accompanying drawings in which:

DETAILED DESCRIPTION OF THE PREFERRED EMBODIMENT

Figure 1:
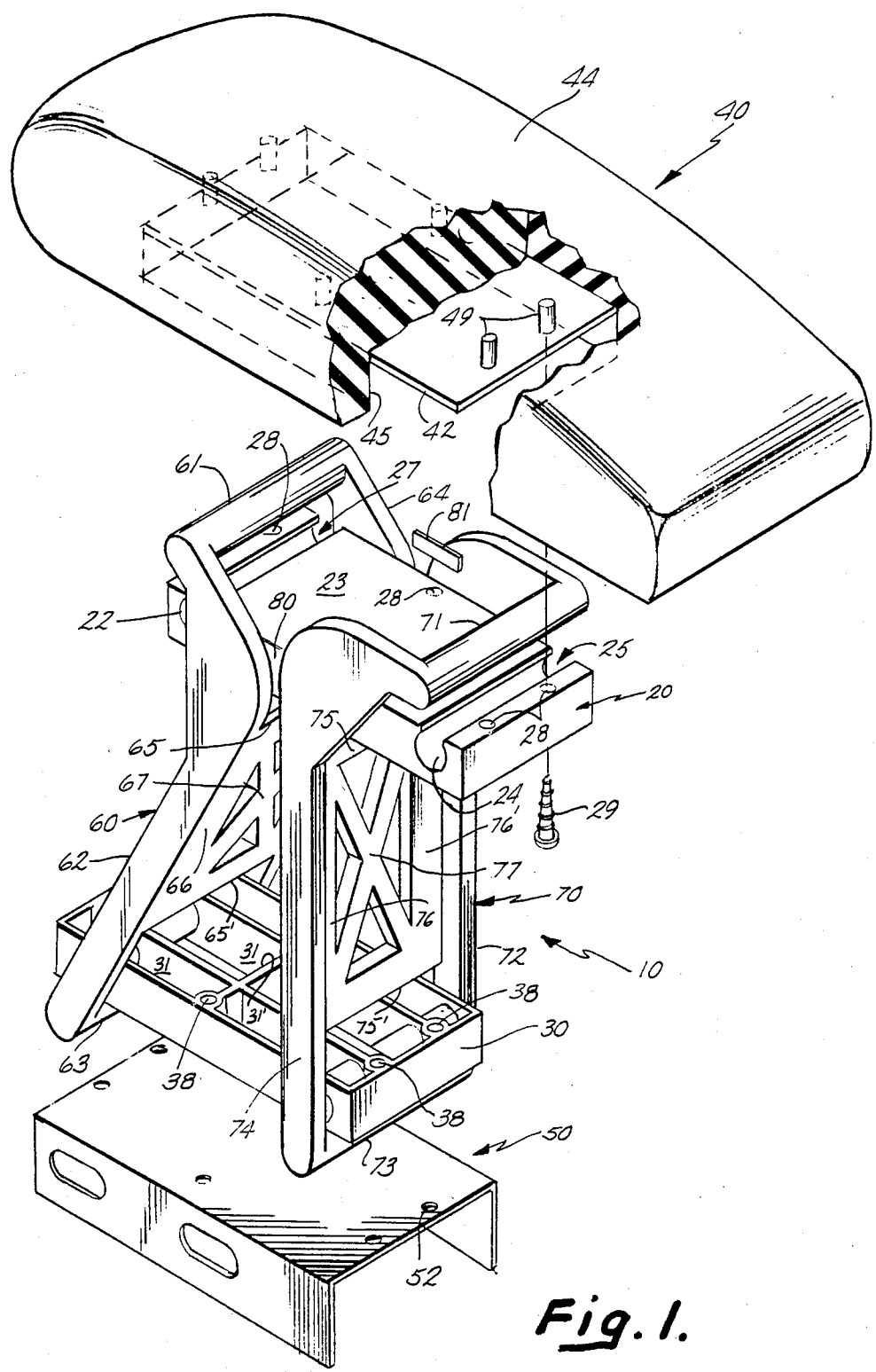
FIG. 1 is an exploded, perspective view, partly broken away, of an armrest embodying the present invention.

Referring initially to FIG. 1, the armrest assembly 10 shown therein includes a pair of substantially identical mounting brackets defining support members 20 and 30 each of which are integrally molded of a suitable polymeric material such as polypropylene or Nylon. The support members include semi-cylindrical recesses 22, 24 and 32, 34 extending the width of the support members in parallel spaced relationship with respect to one another. Each of the semi-cylindrical recesses open through the floors 23 and 33 of the mounting brackets defining slots 25, 27 and 35, 37 for receiving pivot rods associated with L-shaped legs 60 and 70. The walls of recesses 22, 24, 32 and 34 circumscribe an arc of approximately 270 degrees with the slots opening approximately 90 degrees of arc permitting the pivot rods associated with the L-shaped legs to snap-fit into the resilient polymeric sockets so formed. Support members 20 and 30 include a plurality of apertures 28 and 38, respectively, for receiving fastening screws, with one screw 29 being illustrated which extends through the support member into either the armrest pad 40 or a sheet metal support frame 50. As can best be seen by reference to support plate 30, shown in FIG. 1, the member has a substantially hollow interior bridged by a plurality of reinforcing partitioning walls 31 extending longitudinally of the plate and at least one partitioning wall 31' extending transversely between the side and end walls of the rectangular support member. Each of the members 20 and 30 are integrally molded and are identical.

The armrest assembly 10 further includes a pair of generally L-shaped legs 60 and 70 which are identical to each other with the legs being defined by generally L-shaped end walls 62, 64 and 72, 74 which are horizontally spaced from one another and joined to one another at opposite ends by pivot rods 61, 63 and 71, 73. Each of the end walls 62, 64 and 72, 74 include an elongated, generally vertical segment or leg and a shorter, generally horizontal segment or foot. The junction of the foot portion and leg portion of each of the L-shaped members includes a filet of material for adding strength thereto.

Between the ends defining the L-shaped legs, there is provided a generally rectangular frame including upper and lower legs 65, 65' and 75, 75' integrally joined to vertically extending legs 66, 66' and 76, 76' with an X brace 67 and 77 extending from the corners of the rectangular support frame joining the end walls of the L-shaped leg structure. The upper and lower legs of the rectangular frame 65, 65' and 75, 75' are spaced from the pivot rods to allow the support members 20 and 30 to fit in place with the width of members 20 and 30 being sufficiently less than the spacing between the inner surfaces of legs 62, 64 and 72, 74 such that the support plates fit between the legs and between the pivot rods associated with the legs and the central reinforcing framing structure. The pivot rods 61, 63 and 71, 73 have an outer diameter slightly less than the inner diameter of the semi-cylindrical sockets such that they snap-fit therein and provide smooth pivoting action, as illustrated in FIGS. 2 and 3.

The upper member 20 is secured to the armrest pad assembly 40 which includes a mounting plate 42 which can be integrally molded therein and a foam cushion and covered armrest pad 44 made of a foam polyurethane covered with a suitable fabric or vinyl material. Plate 42 is integrally molded therein within a generally rectangular recess 45 opening into and upwardly from the bottom surface of pad 44. Fasteners 29 extend upwardly through support member 20 into mounting plate 42 which includes a plurality of threaded sockets 49 for threadably receiving the fastening screws. Lower member 30 is similarly attached to a bracket 50 which can be an integral part of a vehicle typically welded to the floor of the vehicle between the driver and passenger seats when positioned in the front seat of the vehicle. Plate 50 includes a plurality of apertures 52 for receiving fastening screws extending downwardly through lower member 30 to secure the armrest assembly to mounting plate 50 and thus the vehicle.

Each of the legs 60 and 70 also include a stop member 80 and 81, respectively, formed on the inside wall of leg 62 and 72 for the purpose set forth below with reference to FIGS. 2 and 3. The stops 80 and 81 are sufficiently narrow to clear the space between the sidewalls of the support member 20 and the inside of the associated leg. The armrest structure can be pre-assembled by snap-fitting the legs into the sockets formed in the support members and subsequently mounting the armrest 40 to the upper plate 20. The assembly can then later be installed in a vehicle by securing the lower support member 30 to the underlying support platform 50.

Figure 2:
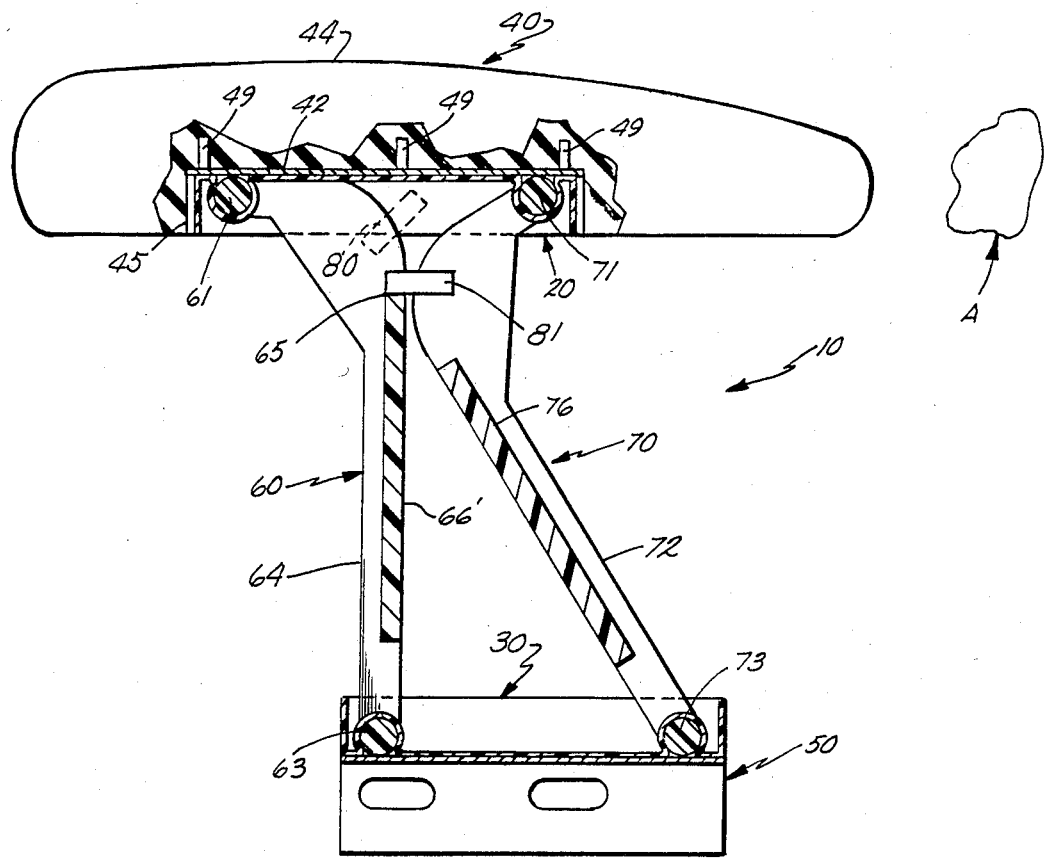
FIG. 2 is a vertical, cross-sectional view of the structure shown in FIG. 1 in an assembled position showing the armrest in a rearward adjusted position.
Figure 3:
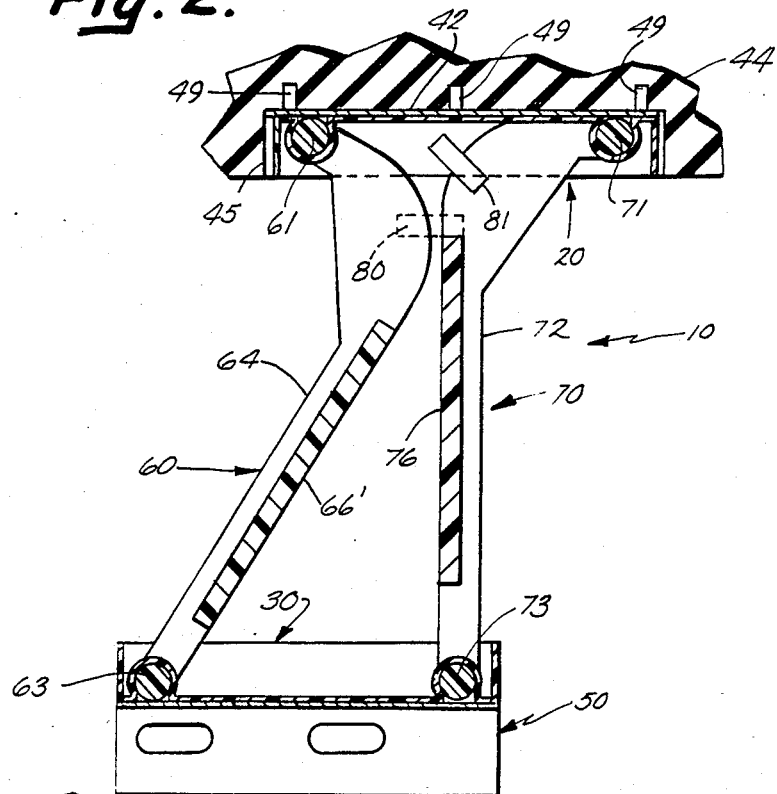
FIG. 3 is a fragmentary view of the structure shown in FIG. 2 with the armrest shown in a forward adjusted position.

The operation of the armrest once assembled and installed is illustrated in FIGS. 2 and 3. FIG. 2 illustrates the armrest in its rearwardly adjusted position with L-shaped member 60 having the leg portion of its inner and outer segments 62 and 64, respectively, in a vertical position and L-shaped member 70 having its leg portion inclined such that stop 81 engages the upper contact surface of cross arm 65 which in the area of contact with stop 81 is integral with vertically extending support walls 66'. For purposes of illustration only, the remaining stop 80 is shown in phantom form in FIGS. 2 and 3, it being understood that it is on a leg not shown in the cross-sectional view.

When in the position illustrated in FIG. 2, the armrest pad 44 is retracted away from objects in the area designated by arrow A in the Figure which objects may include for example parking brake levers or the like. Also, it is located more toward the back of the seats which can for some people be a more comfortable position for use of the armrest. The armrest can be adjusted, as illustrated in FIG. 3, by pushing the pad assembly 40 forwardly which causes the armrest to lift slightly and pivot in an arc about pivot points 63 and 73 to the position shown in FIG. 3 in which the forward L-shaped leg 70 is vertical to provide maximum strength against the compressive weight of an arm with stop 80 now being in a position to engage the top surface of cross arm 75 to provide a stop for the armrest in this adjusted position. In the forward position, the armrest typically will be placed in a position to support the forearm of the vehicle occupant. By providing L-shaped legs which are assembled to be facing away from one another, i.e., in opposite directions, the upper ends or feet portions of the L-shaped members can compactly fit within the recess 45 of the armrest assembly and yet clear one another during motion between the two adjusted positions as well as provide a significant amount of adjustable travel. Thus, in the preferred embodiment of the invention, where the vertical distance between each of the upper and lower pivot points was approximately seven inches, the fore and aft adjustable travel was four inches with the horizontal spacing between the pivot points also being four inches. Legs 60 and 70, like support members 20 and 30, are integrally molded of a suitable polymeric material such as polypropylene or Nylon suitably pigmented to match the vehicle's interior if desired.

It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A vehicle armrest assembly comprising:
   upper and lower mounting brackets each including a pair of spaced sockets extending in parallel relationship to each other; and
   a pair of substantially identical support members each formed of two spaced L-shaped members, each L-shaped member formed of an elongated leg extending upwardly and a shorter leg extending laterally from the upper end of said upwardly extending leg, said L-shaped members being integrally coupled to each other by pivot rods extending between said L-shaped members at the upper and lower ends thereof, said L-shaped members adapted to be coupled to said mounting brackets with said pivot rods pivotally fitted in said sockets of said brackets, said shorter legs of the L-shaped members of one support member facing away from the shorter legs of the L-shaped members of the other support member;
   said L-shaped legs of each support member, having support frame members extending therebetween and forming a cross arm with a contact surface located adjacent the intersection of said legs; a stop member on each support member located above said contact surface and extending away from the support member on which it is located and toward said other support member for engaging the contact surface of said support member; and
   an armrest pad secured to an upper side of said upper mounting bracket.

* * * * *